G. W. ZEBOLD.
GAS METER.
APPLICATION FILED MAR. 8, 1919.

1,360,612.

Patented Nov. 30, 1920.

Inventor
George W. Zebold,
Toulmin & Toulmin,
Attorneys

UNITED STATES PATENT OFFICE.

GEORGE W. ZEBOLD, OF DAYTON, OHIO.

GAS-METER.

1,360,612.   Specification of Letters Patent.   Patented Nov. 30, 1920.

Application filed March 8, 1919. Serial No. 281,340.

*To all whom it may concern:*

Be it known that I, GEORGE W. ZEBOLD, a citizen of the United States, residing at Dayton, in the county of Montgomery and State of Ohio, have invented certain new and useful Improvements in Gas-Meters, of which the following is a specification, reference being had therein to the accompanying drawing.

This invention relates to improvements in gas meters and has for its particular object to provide improved means for detachably securing the diaphragms or bellows in position.

Another object of my invention is to provide the inner or stationary wall of the bellows with a depression to provide space for the gas channel or passage.

The common practice is to secure one edge of the collapsible portion of the bellows to one edge of an annular band or rim of thin sheet metal and then solder the opposite edge of the rim to the partition wall of the meter. This is a difficult operation to perform as the soldering must be done after the bellows is assembled and the joint to be soldered is not conveniently accessible.

A further difficulty resulting from the old method of assembling the bellows in the meters is experienced in meter maintenance. Adjustment and repairs of the bellows are frequently necessary, and, when of a character requiring removal of the bellows from the meter, they are usually discarded as it is not practicable to remove and restore the soldered rims to the meter partitions. This materially increases the cost of meter maintenance with respect to both the cost of replacement parts and time and labor required in making the repairs.

To reduce the production cost of the meter bellows or diaphragms, and to simplify and cheapen the maintenance thereof the present invention consists of a self-contained detachable bellows unit adapted to be secured in position on a wall of the meter without soldering, the connection preferably being made by a single nut.

Referring to the accompanying drawings.

Figure 1:
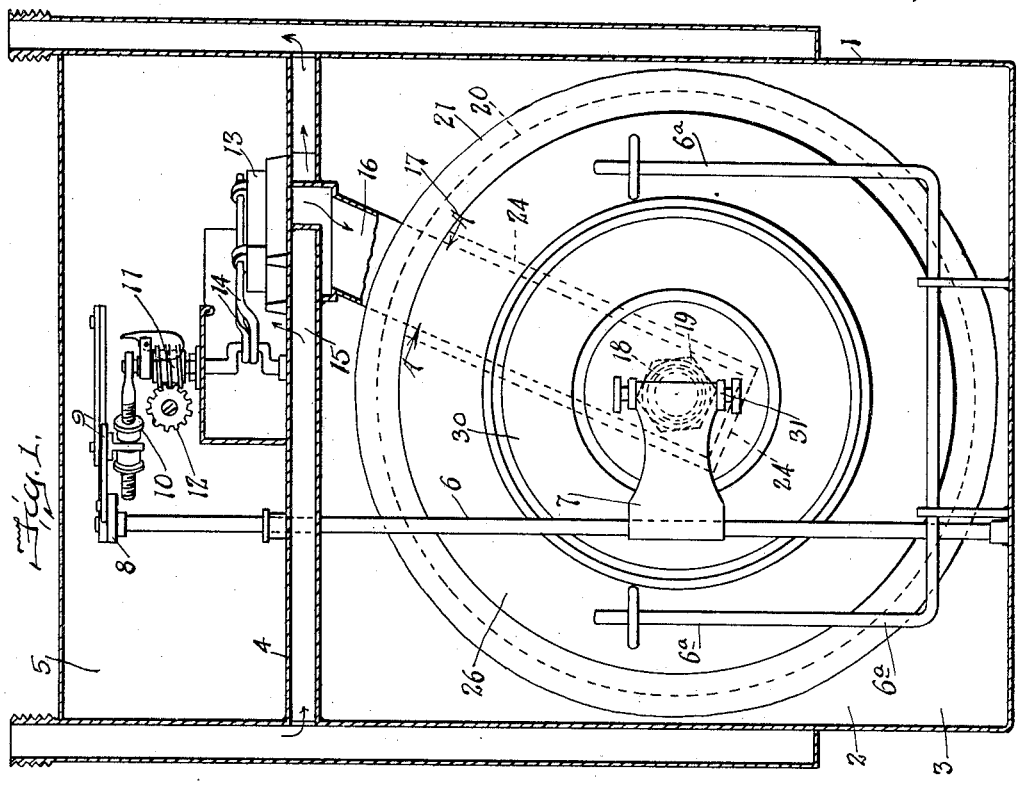
Figure 1 is a sectional side elevation of a standard type of gas meter in which my invention has been applied.

As shown in the drawings, 1 represents the outer casing of the meter, 2 is the central vertical partition which serves to divide the lower portion of the meter into two compartments 3—3 in which the bellows are located, the compartments having duplicate mechanisms. A horizontal partition 4 divides the lower compartments 3—3 from an upper compartment 5 in which the registering mechanism and valve controls are located.

As the present invention is limited to the improved features of the bellows construction a detailed description of the registering mechanism and valves is not required. Briefly stated the registering mechanism consists of the usual indicating dials (not shown) upon which the volume of gas discharged through the meter is registered; the register actuating rods 6—6 which are connected directly to the bellows by means of a plate or "flag" 7, and at their upper ends, by an arrangement of cranks and links 8—9—10, to a worm gear 11 which actuates the register through the spur gear 12.

The controlling valves 13 are also operated through the mechanism 6—7—8—9 and the shaft to which the worm gear is secured and eccentrically mounted crank levers 14—14 and act alternately to open and close the passages 15—15 to regulate the flow of gas through the meter and cause registration of the quantity thereof.

Figure 2:
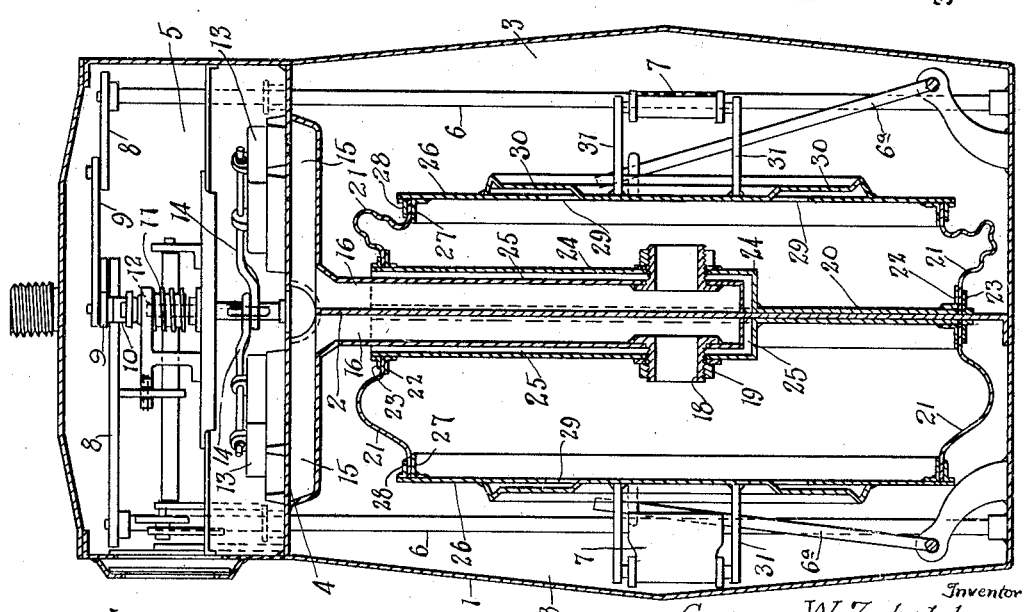
Fig. 2 is a vertical cross section of the meter showing the improved method of attaching the bellows.

Referring now to the bellows construction and the improvements of the present invention applied thereto, as best shown in Fig. 2, the vertical partition 2 divides the meter into two lower compartments as in the old construction, and forms the inner wall of the gas supply channels 16. In the old construction the channels 16 terminate just inside the bellows as shown in dotted line at 17 in Fig. 1 of the drawings. In my improved construction the channels are extended downwardly at an angle substantially beyond the center of the partition and terminate in an apertured projection extending outwardly at right angles to the channel, the projecting end being formed of a threaded sleeve 18 adapted to receive a threaded nut 19 having an aperture extending therethrough.

In the old method of construction the partition 2 forms the inner wall of both the bellows. In my improved construction the inner wall of the bellows consists of a separate circular plate of metal 20 to which the inner edge of the collapsible material 21, preferably consisting of leather, is joined by means of a double flange 22—23, the joint preferably being made tight by binding the same with a cord (not shown) extending a number of times around the periphery of the outer flange.

The plate 20 is provided with an inwardly depressed portion 24 rectangular in cross section and extending longitudinally substantially beyond the end of the fuel channel 16, thus providing clearance space for the channel 16 and permitting the plate 20 to fit closely to the partition wall 2. Ample space is preferably provided between the depressed portion 24 of the plate 20 and the walls of the channel 16, as shown at 25, which may be occupied by any suitable material to form a packed joint.

It will be observed that the sleeve projection 18 of the channel 16 projects through the wall of the depressed portion 24 of the plate 20. A suitable packing material is also preferably used between the nut and sleeve and the wall 24 to prevent leakage at the joint.

The outer wall or diaphragm of the bellows consists of a ring 26 which is secured to the flexible material 21 by flanges 27—28 and a wrapping cord in the same manner in which the plate 20 is secured thereto by the flanges 22—23. The ring or plate 26 has an aperture 29 at its central portion to provide access to the nut 19, the aperture being covered by a plate 30, which, as here shown, is soldered to the plate 26 to form a tight joint, thus causing the parts to move in the operation of the bellows as one piece, the flag member 7 being secured to plate 30 by means of a bracket 31. It is obvious, of course, that a packed joint may be formed between plates 26 and 30 by any suitable material and arrangement, the construction here shown being for illustration purposes only and following the usual method of soldering the joints of the meter.

From the foregoing detailed description it will be apparent that my invention consists of a simple, effective arrangement for securing the bellows; that the new construction is made cheaper and better than the old by eliminating the soldering operation required to secure the bellows to the partition wall; and that the bellows may be detached and repaired as a unit and readily reassembled in the meter without discarding or replacement of parts.

Having thus fully described my invention, what I claim as new and desire to secure by Letters Patent, is:—

1. In a gas meter, the combination, with a stationary partition, a bellows detachably secured adjacent thereto and having a depressed portion, a gas passage extending over said partition, longitudinally within said depressed portion into the bellows, and means within the bellows for securing the same in position.

2. In a gas meter, the combination, with a partition, a bellows detachably secured adjacent thereto and comprising a plate constituting the inner wall thereof and having a depressed portion therein, a gas passage extending between the plate and partition, through said depression, into the bellows, and means within the bellows for securing the same in position.

3. In a gas meter, the combination, with a partition, a bellows detachably secured in position and comprising a plate constituting the inner wall thereof and having a depressed portion therein, a passage secured to the partition, extending through said depression to substantially the center of the bellows, and having a threaded portion extending into the bellows, and an apertured nut within the bellows fitting said threaded portion and adapted to secure the bellows in position.

4. In a gas meter, the combination, with a partition, a bellows detachably secured in position and comprising a plate constituting the inner wall thereof and having a depressed portion therein, a gas passage extending between the plate and partition, through said depression, into the bellows, and clearance space providing for a packed joint between said depression and passage.

5. In a gas meter, the combination, with a partition, a gas passage, an apertured, threaded projection extending outwardly from said partition, a bellows adapted to be detachably secured in position and comprising an inner plate having a depressed portion extending over said passage and an aperture in said depression through which said projection extends; an outer apertured plate of the bellows and an apertured nut introduced through the aperture of the outer plate and adapted to be secured to said projection, whereby the bellows is supported.

6. In a gas meter, the combination, with a partition, a gas passage, an apertured, threaded projection extending outwardly from said passage, a bellows adapted to be detachably secured in position and having a depression inclosing the gas passage, an inner apertured plate through which said projection extends, and an outer apertured plate; an apertured nut introduced through the aperture of the outer plate and adapted to be secured to said projection, whereby the bellows is secured in position.

7. In a gas meter, the combination, with a partition, a gas passage, an apertured, threaded projection extending outwardly from said passage, a bellows adapted to be detachably secured in position and having a depression inclosing said gas passage, an inner apertured plate through which said projection extends, and an outer apertured plate; an apertured nut introduced through the aperture of the outer plate and adapted to be secured to said projection, whereby the bellows is secured in position, and a detachable plate secured to said outer plate to cover the aperture therein.

8. In a gas meter, a wall, a bellows having a depressed portion in one of its walls, and a gas passage between said bellows wall and the wall first named and within said depression and communicating with said bellows.

9. In a gas meter, a wall, a bellows having a wall with a depression therein and fitting closely to said first named wall, and a gas passage between said walls and extending along said depression.

In testimony whereof I affix my signature.

GEORGE W. ZEBOLD.